G. W. GREGORY.
Shovel.
No. 104,140.
Patented June 14, 1870.
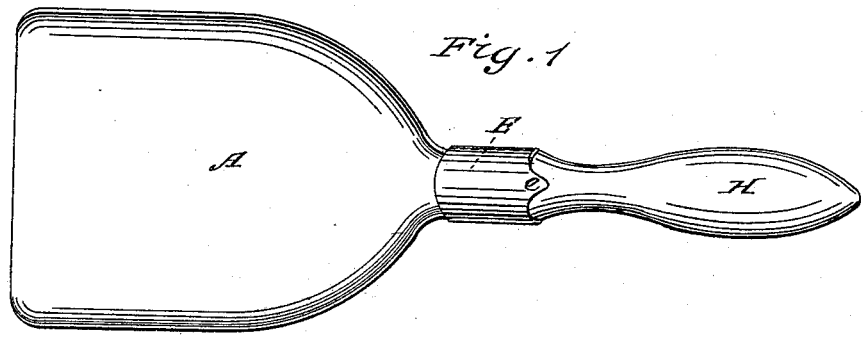
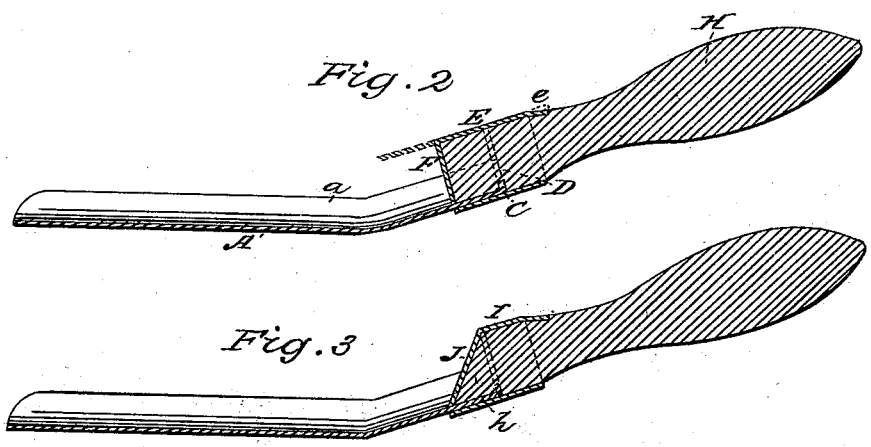
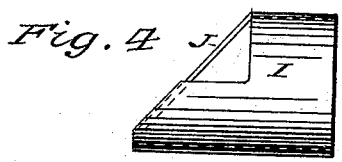
Witnesses:
Emerson Goddard
P. R. Hawxhurst
Inventor:
Geo. W. Gregory
N. PETERS, PHOTO-LITHOGRAPHER, WASHINGTON, D.C.

United States Patent Office.

GEORGE W. GREGORY, OF NEW YORK, N. Y.

Letters Patent No. 104,140, dated June 14, 1870.

IMPROVEMENT IN SHOVELS.

The Schedule referred to in these Letters Patent and making part of the same

I, GEORGE W. GREGORY, of New York city, in the county and State of New York, have invented certain new and useful Improvements in Shovels for Coal and other purposes, of which the following is a specification.

The object of my invention is to secure the shovel firmly and cheaply to its handle, and, to that end, My invention consists in providing the shovel with a turned-up lip, to enter a groove made in the handle, the two being held firmly together by means of a ferrule, constructed as fully described hereafter.

Of the accompanying drawing—

Figure 1 represents a top view of a shovel;

Figure 2 represents a longitudinal central section of the same;

Figure 3 represents a modified form of construction in central section; and

Figure 4 represents, detached, the ferrule shown in fig. 3.

In all the figures like letters indicate like parts.

A is the shovel body, struck up, by means of a die, from sheet metal, or it may be cast.

The shovel has the usual projecting rim, a, and at its upper end it is provided with an upturned lip, C, adapted to enter an annular groove, D, in the handle H.

E is a ferrule, of wrought-iron, but preferably of malleable iron, and provided, at one end, with a projecting piece, F, and at the other end with a point, e.

When made, and before being applied to the handle, the parts F and e are in the same plane with the top of the ferrule E, as shown in the red lines in fig. 2, but when the shovel and handle are joined, the parts F e are bent into the shape shown in fig. 2.

In fig. 3 the forward end of the handle is cut away at h, and the ferrule constructed as shown in fig. 4, so that when in place the part J (which, when the ferrule I is placed over the end of the shovel and handle, lies in the plane of the top of I,) may be bent only at an obtuse angle, and cover the end of the handle. With malleable iron it is desirable to make the bend as obtuse as possible.

The parts are put together by placing the ferrule over the end of the handle and sliding it toward the bulged portion thereof; the lip of C is placed in the groove D, the ferrule shoved down over the shovel end, as shown, and the projecting piece F then bent down, as shown in the figure, thus thoroughly confining the shovel to the handle, and protecting the end of the shovel-handle from the action of fire from coals. The part e is then bent down, forming an extra holding-point.

The part e is not necessary when the part F is used. The part e might be used alone to confine the ferrule in position around the shovel and handle, and in such cases I prefer to provide the under side of e with a projecting point, as shown in red in fig. 3, and so, when e is bent down, its point will enter the wood of the handle.

The shovel and handle might be held with a plain ferrule, and secured by a suitable rivet.

Having described my invention,

I claim—

1. A shovel, having at its upper end an upturned lip, a grooved handle, and a ferrule, when constructed and combined substantially as described.

2. A ferrule, having a projecting piece at its forward end, which may be bent down to partially close the end of the ferrule, substantially as described.

GEO. W. GREGORY.

Witnesses:
EMERSON GODDARD,
P. R. HAWXHURST.